US006365683B2

(12) United States Patent
Podszun et al.

(10) Patent No.: US 6,365,683 B2
(45) Date of Patent: Apr. 2, 2002

(54) PROCESS FOR PREPARING MONODISPERSE CROSSLINKED BEAD POLYMERS

(75) Inventors: Wolfgang Podszun, Köln; Lothar Feistel, Delitzsch; Olaf Halle, Köln; Claudia Schmid, Leverkusen; Alfred Mitschker, Odenthal, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/737,270

(22) Filed: Dec. 14, 2000

(30) Foreign Application Priority Data

Dec. 24, 1999 (DE) .......................... 199 62 864
Apr. 18, 2000 (DE) .......................... 100 19 144

(51) Int. Cl.$^7$ .................................. C08F 2/18
(52) U.S. Cl. .................. 526/80; 526/526; 526/78; 526/218.1; 526/227; 526/336; 526/342; 526/347; 521/25
(58) Field of Search ............... 526/78, 80, 347, 526/336, 342

(56) References Cited

U.S. PATENT DOCUMENTS

| 3,922,255 A | 11/1975 | Koestler et al. | |
| 4,427,794 A | 1/1984 | Lange et al. | 521/28 |
| 4,623,706 A | 11/1986 | Timm et al. | 526/88 |
| 5,068,255 A | 11/1991 | Harris | 521/28 |
| 5,834,524 A | 11/1998 | Bloodworth et al. | 521/30 |
| 6,020,385 A | 2/2000 | Halle t al. | 521/31 |

FOREIGN PATENT DOCUMENTS

| DE | 198 05 248 | 8/1999 |
| DE | 198 52 667 | 5/2000 |
| EP | 0 098 130 | 1/1984 |
| EP | 0 101 943 | 3/1984 |
| EP | 0 173 518 | 3/1986 |
| EP | 994 124 | 9/1999 |

*Primary Examiner*—Fred Zitomer
(74) *Attorney, Agent, or Firm*—Joseph C. Gil; Richard E. L. Henderson

(57) ABSTRACT

The invention relates to a process for preparing substantially monodisperse crosslinked bead polymers useful as precursors for ion exchangers.

12 Claims, No Drawings

PROCESS FOR PREPARING MONODISPERSE CROSSLINKED BEAD POLYMERS

BACKGROUND OF THE INVENTION

The invention relates to a process for preparing substantially monodisperse crosslinked bead polymers useful as precursors for ion exchangers.

In recent times increasing importance has been placed on ion exchangers with very uniform particle size (hereinafter termed "mono-disperse"), since the more advantageous hydrodynamic properties of an exchanger bed made of monodisperse ion exchangers can provide cost advantages in many applications. Monodisperse ion exchangers can be obtained by functionalizing monodisperse crosslinked bead polymers.

One way of preparing monodisperse crosslinked bead polymers is known as the seed/feed process. In this process, monodisperse polymer particles ("seed") are swollen in the monomer, which is then polymerized. These seed/feed processes are described in EP 98,130 B1 and EP 101,943 B1, for example. EP-A 826,704 and DE-A 19,852,667 disclose seed/feed processes using microencapsulated polymer particles as seed. Compared with conventional, directly synthesized bead polymers, the bead polymers obtained by the processes described above have an increased content of uncrosslinked soluble polymer. This content of uncrosslinked soluble polymer is undesirable during the conversion to ion exchangers, since the polymer fractions dissolved out can become concentrated in the reaction solutions used for the functionalization. In addition, the relatively large amounts of soluble polymer can cause undesirable leaching of the ion exchangers.

U.S. Pat. No. 5,068,255 describes a seed/feed process in which a first monomer mixture is polymerized to a conversion of from 10 to 80% and is then mixed with a second monomer mixture essentially free from free-radical initiator as feed under polymerizing conditions. However, this process cannot prepare monodisperse particles.

The object of the present invention is to provide monodisperse crosslinked bead polymers with a low content of soluble polymer. It has now been found that monodisperse crosslinked bead polymers with a low content of soluble polymer can be obtained by a seed-feed process in which the seed used comprises incompletely polymerized, monodisperse microencapsulated monomer droplets.

SUMMARY OF THE INVENTION

The present invention relates to a process for preparing mono-disperse crosslinked bead polymers as precursors for ion exchangers comprising (a) preparing monodisperse monomer droplets in aqueous suspension from a monomer mixture 1 comprising styrene, divinylbenzene, and a free-radical generator, (b) microencapsulating the resultant monomer droplets, (c) polymerizing the microencapsulated monomer droplets to a conversion of from 10 to 75%, (d) adding a monomer mixture 2 comprising styrene and divinyl-benzene at a temperature at which the free-radical generator from monomer mixture 1 is active, whereupon the monomer mixture penetrates into the microencapsulated monomer droplets that have begun to polymerize, and (e) completing the polymerization of the monomer mixtures.

One preferred embodiment of the present invention relates to a process in which monomer mixture 2 also comprises acrylonitrile and/or a free-radical generator and in which at least one of the free-radical generators from monomer mixture 1 or 2 is active in step (d).

One particular embodiment of the present invention relates to a process for preparing monodisperse crosslinked bead polymers as precursors for ion exchangers comprising (a) producing monodisperse monomer droplets in aqueous suspension from a monomer mixture 1 comprising from 87.5 to 99.7% by weight of styrene, from 0.2 to 10% by weight of divinylbenzene, and from 0.1 to 2.5% by weight of a free-radical generator, (b) microencapsulating the resultant monomer droplets, (c) polymerizing the microencapsulated monomer droplets to a conversion of from 10 to 75%, (d) adding a monomer mixture 2 comprising from 80 to 99% by weight of styrene, from 1 to 12% by weight of divinylbenzene, from 0 to 8% by weight of acrylonitrile, and, optionally, a free-radical generator at a temperature at which at least one of the free-radical generators from monomer mixture 1 or monomer mixture 2 is active, whereupon the monomer mixture penetrates into the microencapsulated monomer droplets that have begun to polymerize, and (e) completing the polymerization of the monomer mixtures.

DETAILED DESCRIPTION OF THE INVENTION

The monomer mixture 1 preferably comprises from 89.5 to 99.4% by weight of styrene, from 0.5 to 8% by weight of divinylbenzene, and from 0.1 to 2.5% by weight of free-radical generator, particularly preferably from 92.5 to 98.7% by weight of styrene, from 1 to 6% by weight of divinylbenzene, and from 0.3 to 1.5% by weight of free-radical generator. The percentages given for divinylbenzene are based on pure divinylbenzene. It is, of course, also possible to use commercial qualities of divinylbenzene which contain ethylvinylbenzene in addition to isomers of divinylbenzene.

Free-radical generators that may be used are conventional initiators such as azo compounds and/or peroxo compounds, for example:

dibenzoyl peroxide
dilauroyl peroxide
bis(p-chlorobenzoyl) peroxide
dicyclohexyl percarbonate
2,2'-azobisisobutyronitrile
2,2'-azobis(2-methylbutyronitrile)

Preferred free-radical generators are aliphatic peroxy esters corresponding to the formulas (I), (II), or (III):

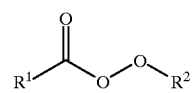

Formula (I)

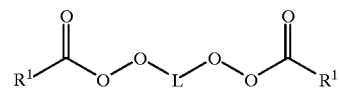

Formula (II)

-continued

Formula (III)

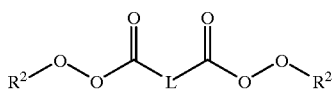

wherein
- $R^1$ represents an alkyl radical having from 2 to 20 carbon atoms or a cycloalkyl radical having up to 20 carbon atoms,
- $R^2$ represents a branched alkyl radical having from 4 to 12 carbon atoms, and
- L represents an alkylene radical having from 2 to 20 carbon atoms or a cycloalkylene radical having up to 20 carbon atoms.

Examples of aliphatic peroxy esters according to formula (I) are tert-butyl peroxyacetate, tert-butyl peroxyisobutyrate, tert-butyl peroxypivalate, tert-butyl peroxyoctoate, tert-butyl peroxy-2-ethylhexanoate, tert-butyl peroxyneodecanoate, tert-amyl peroxyneodecanoate, tert-amyl peroxypivalate, tert-amyl peroxyoctoate, and tert-amyl peroxy-2-ethylhexanoate.

Examples of aliphatic peroxy esters according to formula (II) are 2,5-bis(2-ethylhexanoylperoxy)-2,5-dimethylhexane, 2,5-dipivaloyl-2,5-dimethylhexane, and 2,5-bis(2-neodecanoylperoxy)-2,5-dimethylhexane.

Examples of aliphatic peroxyesters according to formula (III) are di-tert-butyl peroxyazelate and di-tert-amyl peroxyazelate.

It can be advantageous to use mixtures of different initiators, in particular mixtures of initiators with different half-lives.

The conversion of the monomer mixture 1 into monodisperse monomer droplets in step (a) takes place by way of known spraying techniques, by which means the monomer mixture is dispersed in water. Particularly suitable spraying techniques are those that are combined with vibrational excitation. A process of this type is described in detail in EP-A 173,518 and U.S. Pat. No. 3,922,255, for example. The ratio of monomer mixture to water is generally from 1:1 to 1:10, preferably from 1:1.5 to 1:5.

The particle sizes for the monomer droplets are from 10 to 500 µm, preferably from 20 to 400 µm, particularly preferably from 100 to 300 µm. Conventional methods, such as image analysis, are suitable for determining the average particle size and the particle size distribution. The ratio between the 90% value (Ø(90)) and the 10% value (Ø(10)) for the, volume distribution gives a measure of the breadth of the particle size distribution of the novel bead polymers. The 90% value (Ø(90)) is the diameter that exceeds that of 90% of the particles. Correspondingly, the 10%(Ø(10)) diameter value exceeds that of 10% of the particles. For the purposes of the present invention, monodisperse particle size distributions have Ø(90)/Ø(10)≦1.5, preferably Ø(90)/Ø(10)≦1.25.

Possible materials for the microencapsulation in step (b) are those known for this purpose, particularly polyesters, naturally occurring or synthetic polyamides, polyurethanes, or polyureas. A particularly suitable naturally occurring polyamide is gelatin, used in particular as coacervate or complex coacervate. For the purposes of the present invention, gelatin-containing complex coacervates are especially combinations of gelatin with synthetic polyelectrolytes. Suitable synthetic polyelectrolytes are copolymers incorporating units of, for example, maleic acid, acrylic acid, methacrylic acid, acrylamide, or methacrylamide.

Gelatin-containing capsules may be hardened by conventional hardeners, such as formaldehyde or glutaric dialdehyde. The encapsulation of monomer droplets, for example, by gelatin, by gelatin-containing coacervates, or by gelatin-containing complex coacervates, is described in detail in EP 46,535 B1. The methods for encapsulation by synthetic polymers are known. An example of a highly suitable method is interfacial condensation, in which a reactive component dissolved in the monomer droplet (for example, an isocyanate or an acid chloride) reacts with a second reactive component dissolved in the aqueous phase (for example, an amine). Microencapsulation by gelatin-containing complex coacervate is preferred.

The polymerization of the microencapsulated droplets from monomer mixture 1 in step (c) takes place in aqueous suspension at an elevated temperature of, for example, from 55 to 95° C. (preferably from 60 to 80° C.) to a conversion of from 10 to 75% by weight (preferably from 15 to 50% by weight). The ideal polymerization temperature in each case can be calculated by the skilled worker from the half-lives for the free-radical generators. One way of determining the conversion is IR detection of the nonpolymerized double bonds. The suspension is stirred during the polymerization. The stir speed here is not critical. It is possible to use low stirring speeds which are just adequate to maintain the droplets in suspension.

The ratio of monomer mixture 1 to water may correspond to the ratio described under step (a), or may be changed by concentration or dilution. The ratio used of monomer mixture 1 to water is preferably from 1:1.5 to 1:10.

To stabilize the microencapsulated monomer droplets in the aqueous phase, dispersing agents are used. Suitable dispersing agents are naturally occurring or synthetic water-soluble polymers, such as gelatin, starch, polyvinyl alcohol, polyvinylpyrrolidone, polyacrylic acid, polymethacrylic acid, or copolymers made of (meth)acrylic acid or of (meth)acrylates. Also highly suitable are cellulose derivatives, particularly cellulose esters and cellulose ethers, such as carboxymethylcellulose and hydroxyethylcellulose. The amount of the dispersing agents used is generally from 0.05 to 1% (preferably from 0.1 to 0.5%), based on the aqueous phase.

In one particular embodiment of the present invention, the polymerization is carried out in the presence of a buffer system. Preferred buffer systems establish a pH of from 12 to 3 (preferably from 10 to 4) for the aqueous phase at the start of the polymerization. Particularly highly suitable buffer systems comprise phosphate salts, acetate salts, citrate salts, or borate salts.

During the polymerization of the monomer mixture 1 it is possible to use an inhibitor dissolved in the aqueous phase. Either inorganic or organic substances may be used as inhibitors. Examples of inorganic inhibitors are nitrogen compounds, such as hydroxylamine, hydrazine, sodium nitrite, and potassium nitrite. Examples of organic inhibitors are phenolic compounds, such as hydroquinone, hydroquinone monomethyl ether, resorcinol, pyrocatechol, tert-butyl pyrocatechol, and condensation products of phenols with aldehydes. Other organic inhibitors are nitrogen-containing compounds, such as diethylhydroxylamine and isopropylhydroxylamine. Resorcinol is preferred as inhibitor. The concentration of the inhibitor is from 5 to 1000 ppm (preferably from 10 to 500 ppm, particularly preferably from 20 to 250 ppm), based on the aqueous phase.

The monomer mixture 2 is preferably composed of from 82 to 99% by weight of styrene, from 1 to 10% by weight of divinylbenzene, and from 0 to 8% by weight of acrylonitrile, particularly preferably of from 86 to 95% by weight of styrene, from 3 to 8% by weight of divinylbenzene, and from 2 to 6% by weight of acrylonitrile. The monomer mixture 2 may also contain free-radical generators. The free-radical generators described above may be used here. It has been found that the use of significant amounts of free-radical generator in the monomer mixture 2 for the novel process is not disadvantageous. When free-radical generators are used in the monomer mixture 2, bead polymers with high monodispersity are still obtained. As long as the monomer mixture 1 comprises an amount of free-radical generator sufficiently great that it can also polymerize the monomer mixture 2, it is possible to dispense with separate addition of free-radical generator in monomer mixture 2. The ratio of monomer mixture 1 to monomer mixture 2 (seed/feed ratio) is generally from 1:0.5 to 1:10, preferably from 1:0.75 to 1:6.

The addition of the monomer mixture 2 in step (d) to the partially polymerized microencapsulated monomer droplets takes place at a temperature that has been selected so that at least one of the free-radical generators from monomer mixture 1 or 2 is active. Temperatures of from 60 to 90° C. are generally used. To achieve high polymerization conversions, it can be advantageous to raise the temperature during the polymerization.

The monomer is added over a prolonged period, such as from 10 to 1000 min, preferably from 30 to 600 min. The addition may take place at a constant rate or at a rate which changes over time. It is possible for the composition of monomer mixture 2 to alter during the feed period, for example, by starting with a low divinylbenzene content and continuously raising the divinylbenzene content during the feed period, or vice versa.

The monomer mixture 2 may be added in pure form. In one particular embodiment of the present invention, the monomer mixture 2 or a portion of this mixture is added in the form of an emulsion in water. This emulsion in water may be produced in a simple manner by mixing the monomer mixture with water while using an emulsifying agent, with the aid of a high-speed stirrer or rotor-stator mixer. The ratio of monomer mixture to water here is preferably from 1:0.75 to 1:3. The emulsifying agents may be ionic or nonionic in character. Ethoxylated nonylphenols having from 2 to 30 ethylene oxide units are examples of highly suitable materials, as is the sodium salt of isooctyl sulfosuccinate.

To complete the polymerization of the monomer mixtures in step (e), once the addition of the monomer mixture 2 has ended, the reaction mixture is held at a temperature of from 60 to 140° C. (preferably from 90 to 130° C.) for a period of, for example, from 1 to 8 h.

After the polymerization, the bead polymer may be isolated by conventional methods, for example, by filtering or decanting, and may be dried if desired after one or more washes and, if desired, may be screened.

The bead polymers obtained by the novel process are particularly preferably suitable for preparing cation- or anion-exchangers. Surprisingly, they have a particularly low content of soluble polymer. This content is less than 0.8%, preferably below 0.4%.

The novel bead polymers are monodisperse, that is to say they have an extremely narrow particle size distribution. The particle size distribution is the result of the particle size distribution of the monodisperse monomer droplets produced in step (a). The Ø(90)/Ø(10) value is below 1.5, preferably below 1.25.

The conversion of the bead polymers to cation exchangers takes place by sulfonation. Suitable sulfonating agents are sulfuric acid, sulfur trioxide, and chlorosulfonic acid. Preference is given to sulfuric acid at a concentration of from 90 to 100%, particularly preferably from 96 to 99%. The temperature during the sulfonation is generally from 50 to 200° C., preferably from 90 to 110° C. and particularly preferably from 95 to 1050° C. It has been found that the copolymers according to the invention can be sulfonated without adding swelling agents (e.g. chlorobenzene or dichloroethane) and in the process give homogeneous sulfonation products.

For many applications it is advantageous to convert the cation exchanger from the acid form to the sodium form. This ion-exchange takes place using sodium hydroxide solution at a concentration of from 10 to 60%, preferably from 40 to 50%.

After ion-exchange, the cation exchangers may be further purified using deionized water or using aqueous salt solutions, for example, using sodium chloride solutions or sodium sulfate solutions.

The cation exchangers obtained by the novel process have particularly high stability and purity. Even after prolonged use and repeated regeneration, they show no defects on the ion-exchange beads and no leaching of the exchanger. They are also stable over long periods under oxidative conditions.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Determination of Soluble Content

To determine the soluble content, from 5 to 7 g of polymer were weighed into an extraction holder and extracted overnight in a Soxhlet apparatus using 800 ml of toluene (bath temperature 140° C.). The extract was filtered through a suction funnel using a blackribbon filter and concentrated to about 1 ml on a rotary evaporator. 300 ml of methanol were then added, followed by drying in vacuo on the rotary evaporator to constant weight. Two determinations were carried out on each specimen.

Example 1 (Comparative Example)

Example 1 of EP-A 826,704 (counterpart of U.S. Pat. No. 5,834,524) was repeated. The content of soluble polymer was determined as 2.3%.

Example 2 (Inventive)

Preparation of a Bead Polymer

A mixture of 98.75 parts of styrene, 1.25 parts of 80% strength divinylbenzene (in ethylbenzene), and 0.5 part of tert-butyl peroxy-2-ethylhexanoate (monomer mixture 1) was dispersed with the aid of a die plate with vibrational excitation to give droplets with an average particle size of 245 µm and a Ø(90)/Ø(10) value of 1.06 in an aqueous phase. As described in Example 1 of EP 46,535 B1 (counterpart of U.S. Pat. No. 4,427,794), the monomer droplets in a column were encapsulated with a complex coacervate made of gelatin and a copolymer made of acrylamide and of acrylic acid as coacervate component. The monomer droplets were then hardened by adding formaldehyde and freed from excess gelatin and excess copolymer, as well as formaldehyde, by countercurrent washing.

999.7 g of an aqueous mixture containing 503.0 g of microencapsulated monomer droplets, prepared by the above process, were mixed with an aqueous solution containing 12.0 g of gelatin, 20.0 g of sodium hydrogen phosphate dodecahydrate, and 200 mg of resorcinol in 1560 ml of deionized water in a 4-liter glass reactor. The mixture was polymerized at 75° C. for 10.5 h, with stirring (stirrer speed 200 rpm). After a polymerization time of 3.5 h the conversion reached 20%, and monomer mixture 2 containing 1297 g of styrene, 197 g of 80% strength divinylbenzene, and 3 g of dibenzoyl peroxide was added dropwise over a period of 5 h at a constant rate. After completion of the polymerization phase at 75° C., the mixture was held for 2 h at 95° C. The mixture was washed on a 32 µm screen and dried to give 1892 g of a bead polymer with a smooth surface. Visually, the polymers appeared transparent; the average particle size was 370 µm and the Ø(90)/Ø(10) value was 1.06. The bead polymer had a soluble content of 0.20%.

Example 3 (Inventive)

Preparation of a Bead Polymer

A mixture containing 98.75 parts of styrene, 1.25 parts of 80% strength divinylbenzene, and 0.5 part of tert-butyl peroxy-2-ethylhexanoate (monomer mixture 1) was dispersed with the aid of a die plate with vibrational excitation to give droplets with an average particle size of 292 um and a Ø(90)/Ø(10) value of 1.24 in an aqueous phase and microencapsulated as described in Example 2.

999.7 g of the aqueous mixture comprising 503.0 g of microencapsulated monomer droplets were mixed with an aqueous solution made of 6.0 g of gelatin, 20.0 g of sodium hydrogen phosphate dodecahydrate, and 200 mg of resorcinol in 1560 ml of deionized water in a 4-liter glass reactor. The mixture was polymerized at 75° C. for 15.5 h, with stirring (stirrer speed 200 rpm). After a polymerization time of 3.5 h the conversion reached 20%, and monomer mixture 2 containing 1217 g of styrene, 138 g of 80% strength divinylbenzene, 80 g of acrylonitrile, and 3 g of dibenzoyl peroxide was added dropwise over a period of 10 h at a constant rate. After completion of the polymerization phase at 75° C., the mixture was held for 1 h at 95° C. The mixture was washed on a 32 µm screen and dried to give 1805 g of a bead polymer with a smooth surface. Visually, the polymers appeared transparent; the average particle size was 410 µm and the Ø(90)/Ø(10) value was 1.24. The bead polymer had a soluble content of 0.29%.

Example 4 (Inventive)

Preparation of a Bead Polymer

Example 2 was repeated except that monomer mixture 1 was 520 g of a mixture containing 96.25 parts of styrene, 3.75 parts of 80% strength divinylbenzene, and 0.5 part of tert-butyl peroxy-2-ethylhexanoate. The average particle size of the microencapsulated monomer droplets was 295 µm and the Ø(90)/Ø(10) value was 1.08.

1033.5 g of an aqueous mixture comprising 520 g of microencapsulated monomer droplets were mixed with an aqueous solution made of 12.0 g of gelatin, 20.0 g of sodium hydrogen phosphate dodecahydrate, and 200 mg of resorcinol in 1500 ml of deionized water in a 4-liter glass reactor. The mixture was polymerized at 75° C. for 9.5 h, with stirring (stirrer speed 200 rpm). After a polymerization time of 3.5 h the conversion reached 25%, and monomer mixture 2 containing 803 g of styrene, 64.6 g of divinylbenzene, and 1.74 g of 80% strength dibenzoyl peroxide was added dropwise over a period of 4 h at a constant rate. After completion of the polymerization phase at 75° C., the mixture was held for 2 h at 95° C. The mixture was washed on a 32 µm screen and dried to give 1274 g of a bead polymer with a smooth surface. Visually, the polymers appeared transparent; the average particle size was 405 µm and the Ø(90)/Ø(10) value was 1.08. The bead polymer had a soluble content of 0.25%.

Example 5 (Inventive)

Preparation of a Bead Polymer

Example 4 was repeated except that monomer mixture 2 was a mixture of 775.6 g of styrene, 64.6 g of divinylbenzene, 27.8 g of acrylonitrile and 1.74 g of 80% strength dibenzoyl peroxide. Monomer mixture 2 was added dropwise after 4.5 h of polymerization time, corresponding to a polymerization conversion of 35%, over a period of 4 h at a constant rate. The mixture was held for a total of 10.5 h at 75° C. and then 4 h at 95° C. The mixture was washed on a 32 µm screen and dried to give 1321 g of a bead polymer with a smooth surface. Visually, the polymers appeared transparent; the average particle size was 415 µm and the Ø(90)/Ø(10) value was 1.08. The bead polymer had a soluble content of 0.30%.

Example 6 (Inventive)

Preparation of a Bead Polymer

Example 2 was repeated except that monomer mixture 1 was 892 g of a mixture containing 93.75 parts of styrene, 6.25 parts of 80% strength divinylbenzene, and 0.5 part of tert-butyl peroxy-2-ethylhexanoate. The average particle size for the microencapsulated monomer droplets was 320 µm and the Ø(90)/Ø(10) value was 1.06.

1773 g of an aqueous mixture comprising 892 g of microencapsulated monomer droplets were mixed with an aqueous solution made of 12.0 g of gelatin, 20.0 g of sodium hydrogen phosphate dodecahydrate, and 200 mg of resorcinol in 1248 ml of deionized water in a 4-liter glass reactor. The mixture was polymerized at 75° C. for 8.5 h, with stirring (stirrer speed 200 rpm). After a polymerization time of 2.5 h the conversion reached 15%, and monomer mixture 2 made of 780.4 g of styrene, 19.9 g of 80% strength divinylbenzene, and 2.1 g of dibenzoyl peroxide was added dropwise over a period of 4 h at a constant rate. After completion of the polymerization phase at 75° C., the mixture was held for 4 h at 95° C. The mixture was washed on a 32 µm screen and dried to give 1421 g of a bead polymer with a smooth surface. Visually, the polymers appeared transparent; the average particle size was 385 µm and the Ø(90)/Ø(10) value was 1.06. The bead polymer had a soluble content of 0.20%.

What is claimed is:

1. A process for preparing monodisperse crosslinked bead polymers comprising
   (a) preparing monodisperse monomer droplets in aqueous suspension from a monomer mixture 1 comprising styrene, divinylbenzene, and a free-radical generator,
   (b) microencapsulating the resultant monomer droplets,
   (c) polymerizing the microencapsulated monomer droplets to a conversion of from 10 to 75%,
   (d) adding a monomer mixture 2 comprising styrene and divinylbenzene at a temperature at which the free-radical generator from monomer mixture 1 is active, whereupon the monomer mixture penetrates into the microencapsulated monomer droplets that have begun to polymerize, and (e) completing the polymerization of the monomer mixtures.

2. A process according to claim 1 wherein monomer mixture 2 or a portion thereof is added in the form of an emulsion in water.

3. A process according to claim 1 wherein monomer mixture 2 also comprises acrylonitrile and/or a free-radical generator and at least one free-radical generator from monomer mixture 1 or monomer mixture 2 is active in step (d).

4. A process for preparing monodisperse crosslinked bead polymers comprising (a) producing monodisperse monomer droplets in aqueous suspension from a monomer mixture 1 comprising from 87.5 to 99.7% by weight of styrene, from 0.2 to 10% by weight of divinylbenzene, and from 0.1 to 2.5% by weight of a free-radical generator, (b) microencapsulating the resultant monomer droplets, (c) polymerizing the microencapsulated monomer droplets to a conversion of from 10 to 75%, (d) adding a monomer mixture 2 comprising from 80 to 99% by weight of styrene, from 1 to 12% by weight of divinylbenzene, from 0 to 8% by weight of acrylonitrile, and, optionally, a free-radical generator at a temperature at which at least one of the free-radical generators from monomer mixture 1 or monomer mixture 2 is active, whereupon the monomer mixture penetrates into the microencapsulated monomer droplets that have begun to polymerize, and (e) completing the polymerization of the monomer mixtures.

5. A process according to claim 1 wherein the free-radical generator is one or more azo compounds and/or peroxo compounds.

6. A process according to claim 4 wherein the free-radical generator is one or more azo compounds and/or peroxo compounds.

7. A process according to claim 1 wherein step (a) is carried out using a spraying technique involving vibrational excitation.

8. A process according to claim 4 wherein step (a) is carried out using a spraying technique involving vibrational excitation.

9. A process according to claim 1 wherein the monomer droplets from step (a) are microencapsulated in step (b) with a polyester, a naturally occurring or synthetic polyamide, a polyurethane, or a polyurea.

10. A process according to claim 4 wherein the monomer droplets from step (a) are microencapsulated in step (b) with a polyester, a naturally occurring or synthetic polyamide, a polyurethane, or a polyurea.

11. A process according to claim 1 wherein polymerization step (c) is carried out in aqueous suspension at an elevated temperature of from 55 to 95° C.

12. A process according to claim 4 wherein polymerization step (c) is carried out in aqueous suspension at an elevated temperature of from 55 to 95° C.

* * * * *